United States Patent
Hannah et al.

(10) Patent No.: US 10,219,136 B2
(45) Date of Patent: Feb. 26, 2019

(54) SYSTEMS WITH BURIED ANTENNAS FOR BI-DIRECTIONAL COMMUNICATION WITH WHEELED VEHICLES

(71) Applicant: Gatekeeper Systems, Inc., Irvine, CA (US)

(72) Inventors: Stephen E Hannah, Placentia, CA (US); Jesse M James, Santa Ana, CA (US)

(73) Assignee: Gatekeeper Systems, inc., Foothill Ranch, CA (US)

( * ) Notice: Subject to any disclaimer, the term of this patent is extended or adjusted under 35 U.S.C. 154(b) by 0 days.

(21) Appl. No.: 15/645,822

(22) Filed: Jul. 10, 2017

(65) Prior Publication Data

US 2017/0311120 A1    Oct. 26, 2017

Related U.S. Application Data

(63) Continuation of application No. PCT/US2016/012596, filed on Jan. 8, 2016.
(Continued)

(51) Int. Cl.
*B62B 3/14* (2006.01)
*B62B 5/00* (2006.01)
(Continued)

(52) U.S. Cl.
CPC .............. *H04W 4/80* (2018.02); *G06Q 50/30* (2013.01); *B62B 3/1404* (2013.01);
(Continued)

(58) Field of Classification Search
CPC .... H04W 4/008; B62B 3/1404; B62B 5/0096; B62B 3/1424; A47F 10/04; A47F 10/02;
(Continued)

(56) References Cited

U.S. PATENT DOCUMENTS 4,987,394 A * 1/1991 Harman ............ G08B 13/2497
                                                    174/36
5,831,530 A    11/1998 Lace et al.
(Continued)

FOREIGN PATENT DOCUMENTS

KR    10-2001-0018312 A    3/2001
KR    10-2015-0003632 A    1/2015
(Continued)

OTHER PUBLICATIONS

International Search Report and Written Opinion for International Application No. PCT/US2016/012596, dated Apr. 29, 2016, in 16 pages.
(Continued)

*Primary Examiner* — Jianxun Yang
(74) *Attorney, Agent, or Firm* — Knobbe, Martens, Olson & Bear, LLP

(57) ABSTRACT

Various systems for monitoring wheeled vehicles (such as shopping carts) are disclosed. The system can include an RF antenna unit that is buried and is configured for bi-directional communication with the electronics on the cart. In some embodiments, the antenna comprises a plurality of transmitters, which can emit synchronized signals. In some embodiments, the antenna comprises a radiating cable, which can emit a signal along some, substantially all, or all of its length.

31 Claims, 3 Drawing Sheets

Related U.S. Application Data

(60) Provisional application No. 62/102,766, filed on Jan. 13, 2015.

(51) Int. Cl.
  *B62B 5/04* (2006.01)
  *H04W 4/80* (2018.01)
  *G06Q 50/10* (2012.01)
  *G06Q 50/30* (2012.01)

(52) U.S. Cl.
  CPC .......... *B62B 5/0096* (2013.01); *B62B 5/0423* (2013.01); *G06Q 50/10* (2013.01)

(58) Field of Classification Search
  CPC ... G08B 13/2477; G08B 13/2497; B60T 7/18; G06Q 10/087; G01S 13/885; H01Q 1/04; H01Q 13/203; G01N 33/24
  See application file for complete search history.

(56) References Cited

U.S. PATENT DOCUMENTS

| | | | |
|---|---|---|---|
| 6,362,728 B1 | 3/2002 | Lace et al. | |
| 6,945,366 B2 | 9/2005 | Taba | |
| 7,658,247 B2 | 2/2010 | Carter | |
| 7,920,062 B1 | 4/2011 | Konstad et al. | |
| 7,944,368 B2 | 5/2011 | Carter et al. | |
| 8,046,160 B2 | 10/2011 | Carter et al. | |
| 8,463,540 B2 | 6/2013 | Hannah et al. | |
| 8,558,698 B1 | 10/2013 | Hannah et al. | |
| 8,578,984 B2 | 11/2013 | Hannah et al. | |
| 8,674,845 B2 | 3/2014 | Carter et al. | |
| 8,751,148 B2 | 6/2014 | Carter et al. | |
| 8,820,447 B2 | 9/2014 | Carter et al. | |
| 8,894,086 B2 | 11/2014 | Ekbote | |
| 9,205,702 B2 | 12/2015 | Hannah et al. | |
| 9,403,548 B2 | 8/2016 | Hannah et al. | |
| 9,586,606 B2 | 3/2017 | Carter et al. | |
| 9,630,639 B2 | 4/2017 | Carter et al. | |
| 9,669,659 B2 | 6/2017 | McKay et al. | |
| 2006/0247847 A1* | 11/2006 | Carter | A47F 10/04 701/498 |
| 2006/0289637 A1* | 12/2006 | Brice | G06Q 10/087 235/385 |
| 2007/0045019 A1 | 3/2007 | Carter et al. | |
| 2013/0264786 A1 | 10/2013 | Hannah et al. | |
| 2015/0181315 A1* | 6/2015 | Vuran | G01S 13/885 340/870.3 |

FOREIGN PATENT DOCUMENTS

| | | |
|---|---|---|
| WO | WO 2014/015151 A1 | 1/2014 |
| WO | WO 2016/114986 A1 | 7/2016 |

OTHER PUBLICATIONS

International Preliminary Report on Patentability and Written Opinion for International Application No. PCT/US2016/012596, dated Jul. 27, 2017, in 12 pages.

Extended Search Report in corresponding European Patent Application No. 16737646.6, dated Jun. 22, 2018, in 8 pages.

* cited by examiner

SYSTEMS WITH BURIED ANTENNAS FOR BI-DIRECTIONAL COMMUNICATION WITH WHEELED VEHICLES

CROSS REFERENCE TO RELATED APPLICATIONS

This application is a continuation of international patent application no. PCT/US2016/012596, filed Jan. 8, 2016, titled "SYSTEMS WITH BURIED ANTENNAS FOR BI-DIRECTIONAL COMMUNICATION WITH WHEELED VEHICLES," which claims the benefit of priority under 35 U.S.C. § 119(e) to U.S. Provisional Patent Application No. 62/102,766 filed on Jan. 13, 2015 and titled "SYSTEMS WITH BURIED ANTENNAS FOR BI-DIRECTIONAL COMMUNICATION WITH WHEELED VEHICLES;" each of which is hereby incorporated by reference herein in its entirety.

BACKGROUND

Field

The present disclosure relates to systems for tracking the movement and statuses of wheeled vehicles, such as shopping carts, luggage carts, and other human propelled vehicles.

Description of Certain Related Art

A variety of commercially available cart containment systems exist for deterring the theft of shopping carts and other human-propelled vehicles. Some of these systems include a loop of wire that is embedded in the pavement of a store parking lot to define an outer boundary of an area in which shopping cart use is permitted, such as the perimeter of the parking lot. Typically, the loop of wire is used as an antenna to emit a Very Low Frequency (VLF) signal, such as about 8 kHz. When a shopping cart is pushed over this wire, electronics in one of the wheel units of the cart detect the VLF signal and cause the wheel unit to lock.

SUMMARY

Certain cart containment systems include one or more above-ground radio frequency (RF) access points. The access points wirelessly communicate bi-directionally with RF transceivers on the carts at frequencies significantly higher than VLF (e.g., 2.4 GHz, 5.8 GHz, or UHF). To facilitate this communication, the access points may be located in an elevated position, such as on top of a light pole, on a roof, or near the top of a doorway. One example of a cart monitoring system that uses access points (optionally in combination with a VLF communication system) is described in U.S. Pat. No. 8,558,698 (the '698 patent), the disclosure of which is hereby incorporated by reference.

In a system of the type described in the '698 patent, the access points can transmit an RF signal to an area, such as via a directional antenna. The area is typically a location in which it is desirable to monitor the presence and/or number of wheeled vehicles, such as the entry or exit of a store or cart corral. The range at which electronics in one of the wheel units of the cart can receive the transmission above a threshold level (also called the operative range of the signal) can define an action field. When a cart enters the action field, the electronics (e.g., a microchip and transceiver) can receive the signal and perform an action. For example, in response to receiving the signal, the wheel electronics can lock or unlock the wheel.

Although the aforementioned cart containment systems can be useful, such systems present significant challenges. For example, because certain of the aforementioned VLF systems include a loop of wire, such systems can require additional excavation and/or material compared to a non-looped antenna system. Further, such systems are typically only able to communicate mono-directionally (from the wire to the electronics on the cart), and only at low data transfer rates. As such, existing VLF systems are not well suited for receiving information from the carts.

The aforementioned systems with the elevated RF access points can present challenges as well. For example, the signals transmitted by the elevated access point may encounter one or more barriers, such as walls and vehicles. This can block or impede the propagation of the signal, which can result in a reduction in the size of the action field. Further, to reach the electronics on the cart, the signal from the access point needs to travel the distance between the access point and the cart electronics, during which the signal can be subject to interference. This can also result in a reduction in the size of the action field. To compensate for such issues, the signal from the elevated access point may need to be transmitted with additional strength, which can lead to increased power usage.

Moreover, the signal from the elevated access point may be transmitted in unwanted directions, such as in one or more side lobes. This can result in the action field being extended into areas in which it was not intended. Similarly, the signal from the above-ground access points may be inadvertently reflected, thereby potentially transmitting the signal to unintended areas, and thus extending the action field into unintended areas. Carts entering those unintended areas may respond as if the cart is in the intended action field. This can result in the cart taking unwanted actions, such as activating the brake when it should be deactivated, or deactivating the brake when it should be activated.

To solve some or all of the problems described above, or others, some embodiments of the presently disclosed system include a fixed (non-mobile) communication system that uses a buried (e.g., underground, underfloor, or otherwise) RF antenna to communicate bi-directionally with the electronics on the carts in a frequency band significantly above the VLF band. Because the antenna is buried, it typically can be located closer to the electronics in the wheel unit, compared to the systems with elevated RF access points. This can decrease the chance that the signal will encounter a barrier or interference, facilitate a reduction of the signal strength, and/or enable a reduction in the operative range of the signal. Also, because the system can operate on higher frequencies compared to the aforementioned VLF systems, the system can provide sufficient data throughout to enable bi-directional communication between the electronics on the cart and the wheel unit. Moreover, in certain embodiments, the antenna unit is a non-looped antenna (e.g., a monopole antenna), which can facilitate installation.

The summary above has been provided to briefly synopsize certain features of some embodiments of the present disclosure. However, neither this summary nor the following detailed description purports to define the scope of protection. The scope of protection is defined by the claims.

DETAILED DESCRIPTION OF CERTAIN EMBODIMENTS

The present disclosure describes certain embodiments of a buried-antenna, bi-directional, fixed communication system 10 for communicating with and/or monitoring (e.g., tracking, identifying, analyzing, or otherwise) wheeled vehicles. Some embodiments are described in the context of a human-propelled shopping cart 12, due to particular utility in that context. However, the subject matter of the present disclosure can be used to monitor various other types of human-propelled vehicles, such as mobility carts, scooters, wheelchairs, manufacturing or warehouse carts, baggage or luggage carts, medical carts (e.g., hospital carts, medical device carts, stretchers, etc.), and strollers. The system and/or components thereof can be used for tracking motorized and non-motorized vehicles.

I. Overview (FIGS. 1 and 2)

Figure 1:
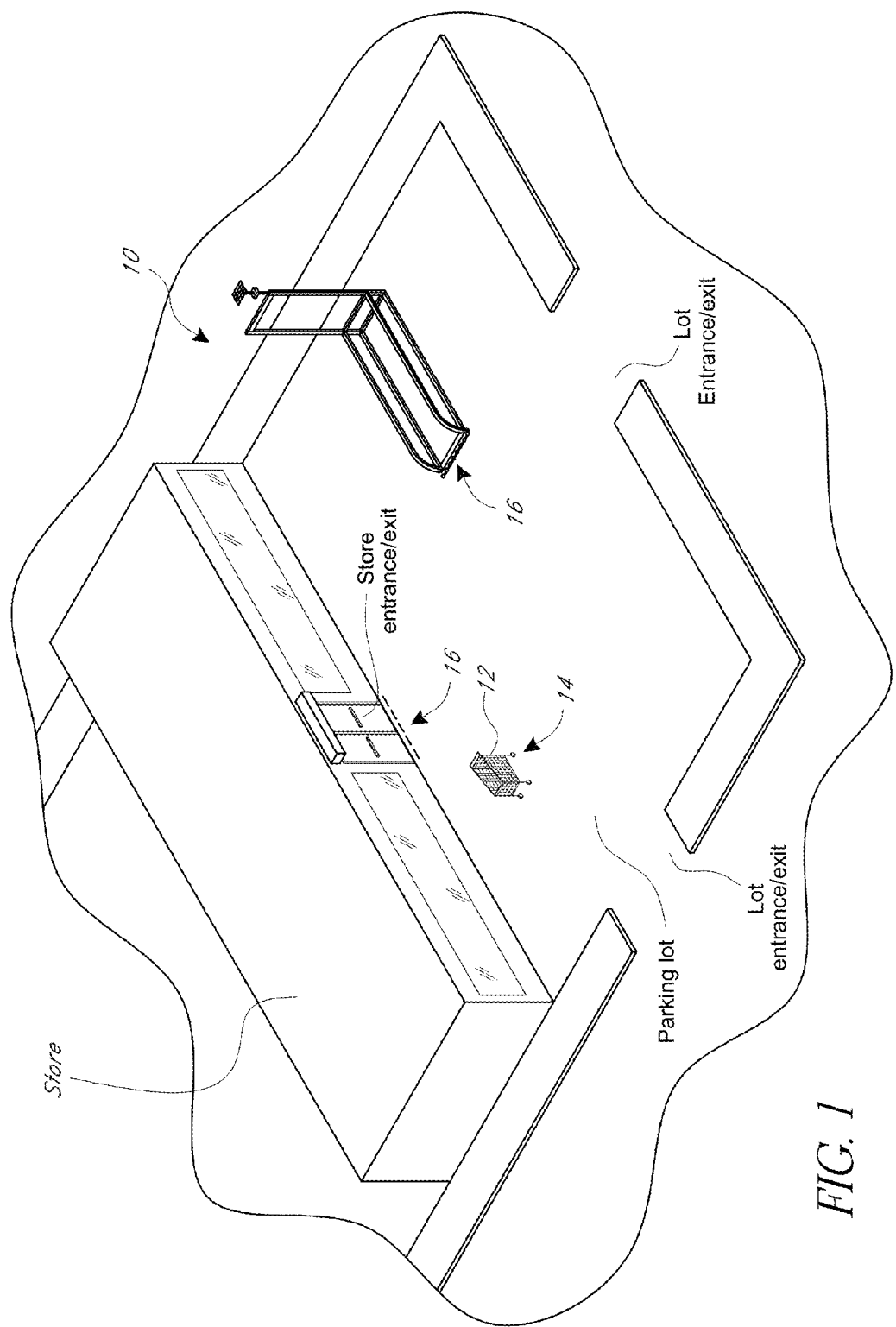
FIG. 1 illustrates a perspective view of a retail store, and associated property, with an embodiment of a cart monitoring system comprising a buried antenna.
Figure 2:
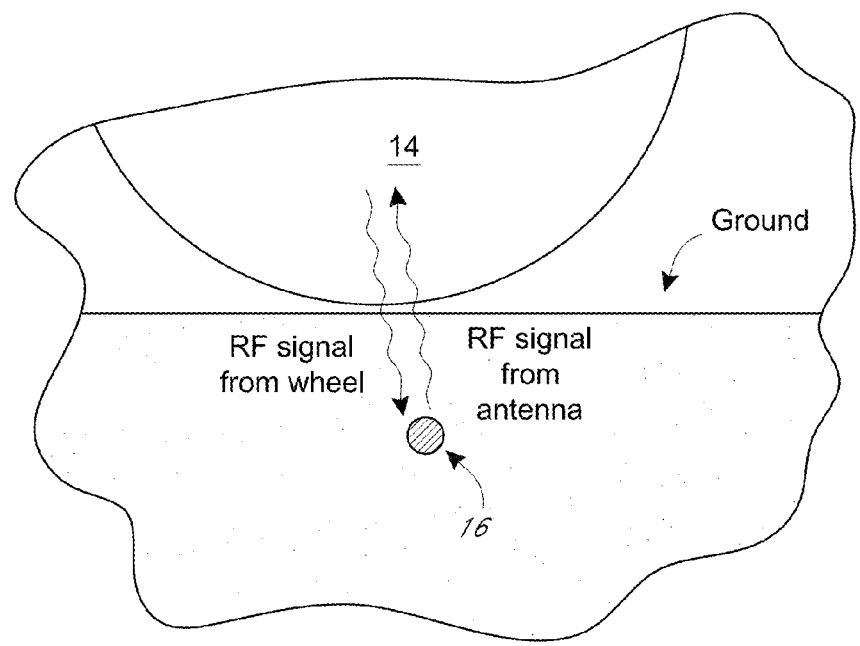
FIG. 2 illustrates a partial view of a shopping cart wheel rolling over the buried antenna of FIG. 1.

As shown in FIG. 1, the system 10 can be used in conjunction with a facility, such as a retail store. Patrons of the store may move shopping carts 12 between the store and an ancillary area, such as a parking lot, via an entry and/or exit door. The parking lot can include cart-accumulating locations (commonly known as cart corrals), which generally include a fenced area for collecting and retaining shopping carts. Cart corrals can facilitate gathering and returning the carts 12 to the store so they may be used by additional patrons.

The shopping carts 12 can each include electronics configured to wirelessly communicate via RF signals. In some embodiments, the electronics are contained in at least one wheel unit 14 of the shopping cart 12. As used herein, the term "wheel unit 14" refers specifically to a wheel assembly that includes such electronics, as opposed to the other wheels or wheel assemblies of the shopping cart. In some implementations, the electronics are positioned elsewhere in or on the cart, such as in or on a frame, handle, display unit, or basket portion of the cart.

In various embodiments, the system 10 includes a buried RF antenna unit 16 and controller 18 (see FIGS. 3 and 5), such as a microprocessor and a memory. In various embodiments, the controller 18 is fixed (e.g., stationary and/or spaced-apart from the carts. As will be discussed in further detail below, the controller 18 can be configured to communicate with the cart electronics via the antenna unit 16 and/or with other system components (e.g., above-ground access point systems, VLF systems, and/or a central control unit). As shown, the antenna unit 16 can be positioned in a location in which the wheel unit 14 rolls over or near during movement of the cart 12. For example, the antenna unit 16 can be located across some or all of the entrance and/or exit to the cart corral and/or the store.

The antenna unit 16 can be buried at or near the surface on which the shopping cart wheels roll. For example, the antenna unit 16 can be buried less than or equal to about 6 inches below the surface on which the wheel can roll. In a parking lot or other outdoor area, the antenna unit 16 can be buried in or under the concrete, asphalt, or other material that forms the surface of the parking lot. In a store or other structure, the antenna unit 16 can be buried in or under a floor or subfloor.

In various embodiments, when the wheel unit 14 approaches (e.g., rolls over or near) the antenna unit 16, the antenna unit 16 and the electronics in the wheel unit 14 can bi-directionally exchange RF signals. In some embodiments, the RF signals from the wheel unit 14 to the antenna unit 16 can include information related to the cart, such as a globally unique identifier, wheel health or status information, whether the wheel has suffered any faults, or otherwise. The RF signals from the antenna unit 16 to the wheel unit 14 can include information related to an instruction (e.g., whether to lock or unlock a brake mechanism on the wheel unit 14) or to a status (e.g., the cart's location).

The fixed communication system and buried elongate antenna unit 16 of the system 10 can provide advantages over systems with an elevated antenna (e.g., mounted on a light pole). For example, when the wheel unit 14 rolls over the buried antenna, the buried antenna is located much closer to the electronics in the wheel unit 14, compared to systems with an elevated antenna. The relative closeness of the wheel unit 14 and buried antenna unit 16 can allow the system 10 to use a reduced operative range compared to the systems with elevated access points. This can decrease the chance that the signal from the antenna unit 16 will be impeded or interfered with. In some embodiments, the operative range of the RF signal emitted by the antenna unit 16 is less than or equal to about: 6 inches, 1 foot, 2 feet, or otherwise. By way of comparison, the operative range of some systems with transmitters positioned on the top of light poles can be 10 feet, 20 feet, or more.

The system 10 can provide advantages over conventional VLF buried anti-theft systems. As noted above, such conventional systems typically are unable to communicate bi-directionally. This can be because of the relatively low rate of information transfer, which is due (at least in part) to the relatively low frequency at which such systems operate. In contrast, the system 10 operates at much higher frequencies than VLF systems, such as in the MHz and/or GHz range (e.g., UHF, 2.4 GHZ, and/or 5.7-5.8 GHz). This can facilitate much higher rates of data transfer, which can enable bi-directional communication between the antenna unit 16 and the wheel unit 14. Additionally, the higher rates of data transfer can enable greater amounts of information to be exchanged in a given time period. For example, rather than the wheel unit 14 merely locking upon detecting a certain VLF signal, in some embodiments of the system 10, the wheel unit 14 can receive detailed instructions (e.g., instructions to reset a navigation system with provided location coordinates, instructions to transmit a status of various attributes of the wheel unit 14, or otherwise) via the signal from the antenna unit 16.

Although the disclosed communication system provides certain benefits over elevated access points and VLF systems, the disclosed system can be used in combination with, and may be integrated with, elevated access points and/or a VLF system. For example, a given store may use different types of fixed communication systems (each capable of communicating with the cart wheel units) in different areas and/or for different purposes. For instance, a buried-antenna, bi-directional, fixed communication system, such as the system 10 described above, may be mounted at the store entrance/exit and used to communicate bi-directionally with carts as they enter and exit the store. Another fixed communication system of this same type may be provided at each cart corral, and used to track the number of carts in the corral. One or more above-ground access points may also be mounted in certain areas in and around the store, such as to create lock and unlock zones in the parking lot as described in the '698 patent. (Where such access points are present, the RF transceiver of each wheel unit may be capable of communicating bi-directionally with both the access points and the buried-antenna transceiver systems.) In addition, or instead of using access points, a conventional VLF system with a buried VLF signal line may be used to emit a lock signal along an outer perimeter of a store parking lot. All of these fixed communication systems (buried-antenna transceiver systems, above-ground access point systems, and VLF systems) may optionally communicate with a central control unit that maintains cart status information.

II. Multiple Transceiver Embodiments (FIGS. 3 and 4)

Figure 3:
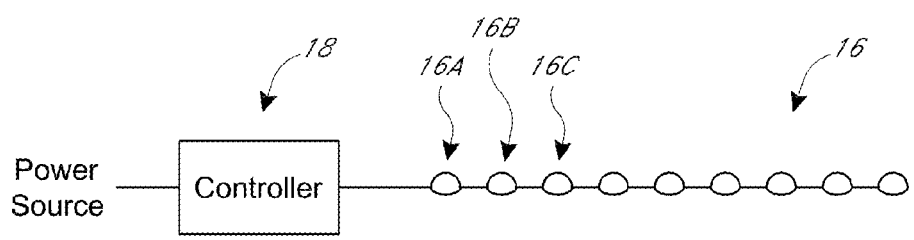
FIG. 3 illustrates a schematic view of a first embodiment of the buried antenna of FIG. 1.
Figure 4:
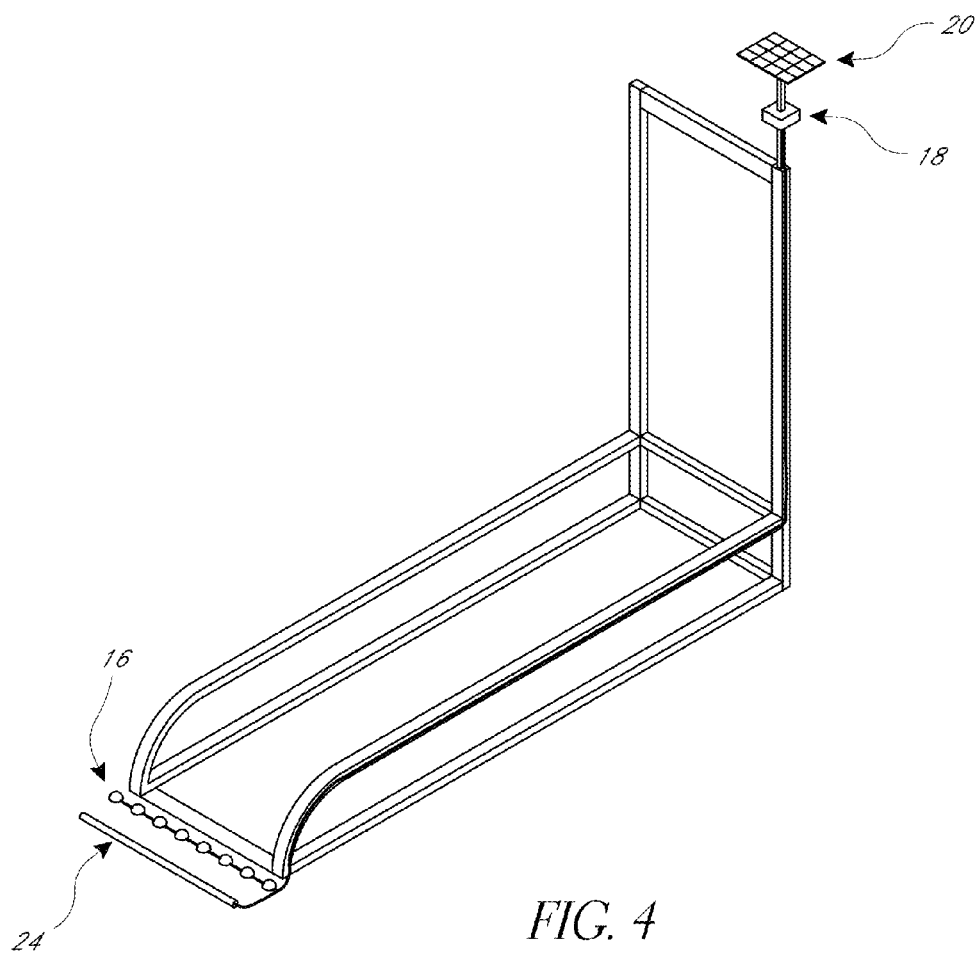
FIG. 4 illustrates a perspective view of a cart corral with the buried antenna embodiment of FIG. 3.

As shown in FIG. 3, the antenna unit 16 of the system 10 can comprise an elongate configuration. For example, in a first embodiment, the antenna unit 16 comprises a plurality and/or a series (e.g., arranged linearly or in a row) of discrete nodes 16A, 16B, 16C, etc. In some embodiments, the nodes are each a radio or other wireless transceiver. In certain variants, the nodes comprise a combination of transmitters, receivers, and/or transceivers. For example, some of the nodes can be configured to receive signals from the wheel 14 while other nodes are configured to transmit signals to the wheel 14. Each of the nodes can be sealed or otherwise environmentally protected. In certain embodiments, a conductor (e.g., wire) or conductor pair supplies power to the nodes 16A, 16B, 16C. In some implementations, the antenna unit 16 has a non-looped configuration. For example the antenna unit 16 can be a monopole antenna. In some embodiments, the antenna unit 16 comprises at least: 3, 6, 9, 12, 15, 20, 25, 30, or more of the nodes The series of transceivers can each individually emit an RF signal, which can be received by the electronics in a wheel unit 14. In some ways, the series of wireless transceivers in the antenna unit 16 can be thought of as being analogous to a series of LED lights in an LED rope light. In the rope light, each of the LEDs is an individual light source, yet the rope light overall provides an elongate source of light. Similarly, in the antenna unit 16, each of the nodes 16A, 16B, 16C, etc. is an individual RF signal source, yet the antenna unit 16 overall provides an elongate source of RF signals. Such a design can reduce losses, increase signal range, and or to decrease material costs (e.g., compared to some of the radiating cable embodiments discussed in more detail below). In some implementations, transmitting the RF signal with the series of transceivers 16A, 16B, 16C permits each of the nodes 16A, 16B, 16C to operate at a lower power than would be required if just a single transceiver was used. In some embodiments, the nodes 16A, 16B, 16C, etc. can be synchronized and/or can transmit synchronized signals, which can inhibit interference between the signals. In certain variants, some or all of the nodes 16A, 16B, 16C, etc. emits an identical signal.

In some embodiments, the transceivers 16A, 16B, 16C, etc. are linked or otherwise configured to communicate with the controller 18. For example, as illustrated, the transceivers can be physically connected to the controller 18 with one or more dedicated communication conductors. In some embodiments, the nodes 16A, 16B, 16C are connected in a serial (daisy-chain) configuration. In other embodiments, the nodes 16A, 16B, 16C are connected in parallel. In certain implementations, the nodes 16A, 16B, 16C communicate with the controller 18 via the conductor or conductor pair that supplies power. In various embodiments, some or all of the nodes 16A, 16B, 16C can communicate with each other, such as with a wired connection or wirelessly.

The controller 18 can be configured to instruct the series of transceivers on when and what type of RF signal to transmit. The controller 18 can also be configured to receive and process RF signals from the wheel unit 14 that are received by the antenna unit 16. In various embodiments, the controller 18 and/or the transceivers are configured to receive electrical power from a power source, such as from a battery, electrical grid, solar panel, or otherwise.

As discussed above, when the wheel unit 14 travels (e.g., rolls) over or near the antenna unit 16, the antenna unit 16 and the electronics in the wheel unit 14 can bi-directionally exchange messages via RF signals. Certain embodiments are configured to establish a communication link between the wheel unit 14 and one of the nodes 16A, 16B, 16C, etc. This can facilitate the wheel unit 14 communicating with just one of the transceivers 16A, 16B, 16C, etc., which can reduce the amount of data to be processed and/or decrease the amount of energy consumed. In certain embodiments, the communications link is regulated by the controller 18. For example, the controller 18 can select one of the transceivers (e.g., the transceiver at which the signal from the wheel unit 14 is strongest) to be the communications link transceiver. In certain embodiments, the controller 18 determines a received signal strength indication (RSSI) value for each of the nodes and selects the node with the highest RSSI value. In some embodiments, the communications link is regulated by the wheel unit 14. For example, the wheel unit 14 can dynamically select communications with the node that has the strongest link margin, greatest received signal strength indication, or otherwise. In various implementations, the transceivers that are not the communications link transceiver are deactivated during the communication link with the wheel unit 14.

In some implementations, the components of system 10 are spaced-apart from and in communication with each other. For example, the system 10 can include the buried antenna unit 16 and a spaced-apart controller 18. Some embodiments also include an above-ground receiver in communication with the controller 18. In certain embodiments, the wheel unit 14 can receive information from the buried antenna unit 16 and can transmit information to the above-ground receiver. In some implementations, the controller 18 is located in the above-ground receiver. In some embodiments, the above-ground receiver and the controller 18 are separate components.

In some variants, the system 10 is arranged as a single assembly. For example, the antenna unit 16 and the controller 18 can be contained as a single assembly.

As indicated above, the system 10 can operate at higher frequencies than conventional VLF systems. In certain embodiments, the system 10 operates in the high frequency (HF), very high frequency (VHF), or ultra high frequency (UHF) band. For example, the RF signals exchanged between the wheel unit 14 and the antenna unit 16 can be at a frequency of at least about 800 MHz, or at a frequency between about 800 MHz and about 900 MHz. In some implementations, the frequency of the RF signals is greater than or equal to about 2.4 GHz. The higher frequency signal range can facilitate bi-directional communication with the electronics in the wheel unit 14. As such, information from the wheel unit 14, such as information related to a status of the wheel, can be communicated to the antenna unit 16, which in turn can route the information to the controller 18 for processing, further routing, or otherwise.

A. Cart Corral Monitoring

As shown in FIG. 4, the buried antenna unit 16 can be located at or near (e.g., adjacent or otherwise in close proximity to) the entrance to the cart corral. This can facilitate communication between the wheel unit 14 of the carts and the controller 18 as the carts enter and/or exit the corral. For example, the wheel unit 14 can transmit signals indicative of the cart identifier, wheel health or status, or otherwise.

In some implementations, at least two antenna units are positioned at or near the entrance to the cart corral. For example, the antenna unit 16 can be used in conjunction with a second antenna unit 24 that is spaced apart from the antenna unit 16. In certain embodiments, the second antenna unit 24 is the same type of antenna as the antenna unit 16 (e.g., both are configured to transmit signals significantly above the VLF range). In other embodiments, the second antenna unit 24 is a different type of antenna than the antenna unit 16 (e.g., the antenna unit 16 is configured to transmit signals significantly above the VLF range and the second antenna unit 24 is configured to transmit a VLF signal). In certain variants, the antenna unit 16 is configured to transmit a signal at a frequency of at least about 2.4 GHz and the second antenna unit 24 is configured to transmit a signal at a frequency of about 8 KHz or less. The second antenna unit 24 can be a looped antenna.

In certain embodiments, the direction of travel of the wheel unit 14 relative to the cart corral can be determined by the order that the wheel unit 14 receives signals (e.g., above a threshold signal strength) from the antenna unit 16 and the second antenna unit 24. For example, in some variants, when the wheel unit 14 receives a signal from the second antenna unit 24 prior to receiving a signal from the antenna unit 16, then the wheel unit 14 is determined to be entering the cart corral, and when the wheel unit 14 receives a signal from the second antenna unit 24 after receiving a signal from the antenna unit 16, then the wheel unit 14 is determined to be exiting the cart corral. In other variants, when the wheel unit 14 receives a signal from the antenna unit 16 prior to receiving a signal from the second antenna unit 24, then the wheel unit 14 is determined to be entering the cart corral, and when the wheel unit 14 receives a signal from the antenna unit 16 after receiving a signal from the second antenna unit, then the wheel unit 14 is determined to be exiting the cart corral. The system 10 can use the information related to the wheel unit 14 entering and/or exiting the corral to determine various attributes of the corral, such as the number of carts in the corral, the capacity of the corral for additional carts, the time and/or rate at which carts are added to or removed from the corral, or otherwise.

In some embodiments, the system 10 can alert store personnel of one or more attributes of the corral, such as whether the cart corral is approaching a full state. To facilitate relaying information from the controller 18 to the store personnel, the controller 18 can directly or indirectly communicate (e.g., on a network) with a central control unit (CCU). The CCU can be implemented as a computer that includes a wired or wireless transceiver card, or that is otherwise configured to communicate with the controller 18. The corral attribute data can be communicated to the CCU, which can indicate the data to the store personnel. For example, the CCU can indicate the corral location, number of carts in the corral, a time that the corral was last serviced (e.g., emptied of all or substantially all carts), or other attributes. In some embodiments, the CCU can issue a visual or audible alert.

In some implementations, the controller 18 is located near the antenna unit 16. For example, the controller 18 can be buried with or adjacent to the antenna unit 16. In certain variants, the controller 18 and the antenna unit 16 are disposed within an enclosure, such as a plastic housing. The enclosure can provide protection to the controller 18 and the antenna unit 16. The enclosure can be buried.

In some embodiments, such as is shown in FIG. 4, the controller 18 is located a distance apart from the antenna unit 16. As illustrated, the controller 18 is located in an enclosure that is mounted on the frame of the cart corral. In some embodiments, the enclosure is located in an elevated position, which can inhibit damage to the controller 18 and/or allow the controller 18 to communicate wirelessly with the CCU. The elevated position of the enclosure can also facilitate the use of a solar panel 20, which can provide electrical power to the controller 18 and/or the antenna unit 16. As shown, a wire or cable can electrically connect the controller 18 and the buried antenna unit 16. In some variants, the antenna unit 16 and controller 18 communicate wirelessly. Thus, some embodiments of the system 10 are configured to take advantage of the benefits of having an antenna that is buried and a controller that is elevated. Moreover, as indicated above, in certain embodiments, the wheel unit 14 can receive information from the buried antenna unit 16 and can transmit information to an above-ground receiver, which can be part of the controller 18 or a separate from the controller 18. For example, the controller 18 and/or the above-ground receiver can be located on the cart corral, a light pole, on a store wall, etc.

B. Store Entrance/Exit Monitoring

In certain embodiments, the antenna unit 16 is positioned at or near an entrance or exit of the store. This can allow the antenna unit 16 to communicate with the wheels 14 of each of the carts as it enters or leaves the store. Thus, similar to the cart corral monitoring previously described, attributes of the carts entering and leaving the store can be monitored and communicated to store personnel. For example, the system 10 can monitor the total number of carts entering or leaving the store in a given time period, the total number of carts in the store and/or in the parking lot, and other attributes.

C. Additional and/or Other Monitoring

Because the wheels 14 can include a globally unique identifier that is communicated during communication with the antenna unit 16, certain embodiments of the system 10 can identify attributes of each cart individually. For example, the system 10 can monitor those carts that have entered and those that have exited the store, and can use the information to determine and/or generate a list of those carts that are in the store and those that are not (e.g., are in the parking lot). Some embodiments can also determine those carts that are in a cart corral, and can use that information to determine and/or generate a list of those carts that are not in an accumulation location (e.g., the store or a corral). Thus, the system 10 can determine which carts are, for example, loose in the parking lot, potentially have been stolen, or are in other non-accumulation locations.

Certain embodiments of the system 10 are configured to determine when the last time a particular cart was used, such as having entered the store, exited the store, or having been placed into a cart corral. If the cart has not been used for an extended period of time (e.g., at least about: 12 hours, 18 hours, 24 hours, or otherwise), that could indicate that the cart may be in an inconvenient location (e.g., in a remote corner of the parking lot), may need repair (e.g., patrons refuse to use it), or may have been stolen. Accordingly, in some embodiments, the system 10 is configured to monitor some or all of the carts and can issue an alarm when one or more of the carts has not been used for an extended period of time. Certain embodiments are further configured to account for times in which the store is closed or typically experiences a decrease in activity, and thus can interrupt (e.g., pause) the determination of the length of time since a given cart was last used.

Figure 5:
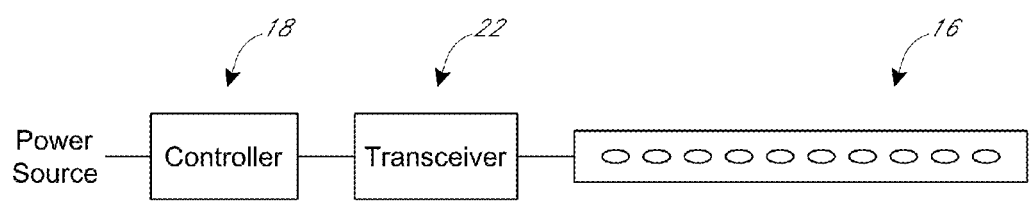
FIG. 5 illustrates a schematic view of another embodiment of a buried antenna.

III. Radiating Cable Embodiments (FIG. 5)

In some embodiments, the antenna unit 16 comprises a radiating cable. Such a cable can allow an RF signal to pass into or out of the cable along substantially its entire length. For example, the radiating cable can be a radiating co-axial cable (also called a leaky cable or a leaky feeder) that includes gaps, holes, or slots in its outer conductor. The radiating cable antenna can be used in place of, or in addition to, the multiple transceiver antenna discussed above. The radiating cable antenna can be used in any of the embodiments discussed above, such as monitoring a cart corral, store entrance and/or exit, or otherwise.

As shown, a transceiver 22 can be connected with the antenna unit 16. The transceiver 22 can transmit and receive signals via the radiating cable. For example, RF signals from the wheel unit 14 can be received by the radiating cable antenna unit 16 and communicated to the transceiver 22, which in turn can communicate information from the signal to the controller 18. Similarly, RF signals from the transceiver 22 can be emitted from the radiating cable antenna unit 16 for reception by the wheel unit 14.

The radiating cable antenna unit 16 embodiment of FIG. 5 can be beneficial because it can be implemented with only a single transceiver, rather than multiple individual transceivers as discussed in connection with the embodiments of FIGS. 3 and 4. Further, because the embodiment of FIG. 5 can operate with just a single transceiver, rather than multiple individual transceivers, the chance for interference from multiple signal sources is reduced. As such, synchronization may be less important or unneeded.

IV. Radio Frequency Identification (RFID) Embodiments

In certain embodiments, the system 10 can include RFID tags and RFID readers. For example, each of the wheels 14 can include an RFID tag and the controller 18 can include an RFID reader. In various embodiments, the RFID reader can include, or be in communication with, a buried antenna, such as the radiating antenna or multiple transceiver antenna discussed above. The RFID system can be used in any of the embodiments discussed above, such as monitoring a cart corral, store entrance and/or exit, or otherwise.

When the wheel unit 14 passes over or near the antenna unit 16, the RFID tag in the wheel unit 14 can transmit information to the RFID reader, such as via the antenna unit 16. In embodiments in which the tags are passive, when the wheel unit 14 is near the antenna unit 16, the tag can receive energy via an RF interrogation signal transmitted from the reader via the antenna unit 16. This can energize the tag to transmit a response signal, such as a backscatter signal. The response signal from the tag can include information about the wheel unit 14, such as the identifier of the wheel, whether the wheel has experienced any faults, or otherwise.

In some other embodiments, the tags are active or semi-active, and can receive at least some power from a power source on the cart, such as a battery in the wheel. In certain such embodiments, the response signal from the tag is at a different frequency than the interrogation signal from the reader.

In some embodiments, the reader can be configured to process the response signal. For example, the reader can generate a received signal strength indication (RSSI) value for the signal, which can enable the reader (or another system component in communication with the reader) to estimate the proximity of the wheel unit 14 to the antenna unit 16 and/or to determine whether an action is appropriate (e.g., based on the generated RSSI value and/or the estimated proximity). For example, if the RSSI value is above a certain value and/or the wheel unit 14 is estimated to be within a predetermined distance (e.g., from the antenna unit 16), then the reader can determine that it is appropriate to transmit a signal commanding the wheel unit 14 to perform an action. In some embodiments, the command signal instructs the wheel unit 14 to transmit a status report, lock or unlock a brake mechanism, or otherwise.

Similarly, in the aforementioned radiating and multiple antenna embodiments, the controller 18 can generate an RSSI value for the RF signal received from the wheel unit 14. In some such embodiments, based on the RSSI and/or an estimated proximity of the wheel unit 14 to the antenna unit 16, the controller 18 can instruct one or more of the plurality of transceivers (in the multiple transceiver embodiment) or the transceiver 22 (in the radiating cable embodiment) to transmit a command signal to the wheel unit 14 via the antenna unit 16. The command signal can instruct the wheel unit 14 to transmit a status report, lock or unlock a brake mechanism, or otherwise.

V. Conclusion

Although the present disclosure has been described in terms of certain illustrative embodiments and uses, other embodiments and other uses that are apparent to those of ordinary skill in the art, including embodiments and uses which do not provide all of the features and advantages set forth herein, are also within the scope of the present disclosure. Components, elements, features, acts, or steps can be arranged or performed differently than described and components, elements, features, acts, or steps can be combined, merged, added, or left out in various embodiments. Indeed, all possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Some embodiments have been described in connection with the accompanying drawings. The drawings are to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Any methods described herein may be practiced using any device suitable for performing the recited steps.

Moreover, while operations may be depicted in the drawings or described in the specification in a particular order, it is to be recognized that such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Language of degree used herein, such as "approximately," "about," and "substantially," and the like, represents an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Conditional language used herein, such as "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Furthermore, while illustrative embodiments have been described herein, persons of skill in the art would recognize that any and all embodiments having equivalent elements, modifications, omissions, combinations, adaptations and/or alterations are also within the scope of this disclosure.

The following is claimed:

1. A system for monitoring shopping carts, the shopping carts each able to travel over and be supported by a parking lot surface, the system comprising:
    a wheel assembly adapted to connect with one of the carts, the wheel assembly comprising a wheel and a wheel transceiver, the wheel being configured to roll on the parking lot surface, the wheel transceiver configured to transmit a first radio frequency (RF) signal, the first RF signal comprising a unique identifier of the wheel assembly;
    a first elongate antenna unit that is buried under the parking lot surface and adjacent to an entrance to an enclosed area, the first elongate antenna unit comprising a plurality of transceivers, at least one of the transceivers being configured to receive the first RF signal from the wheel transceiver and to transmit a second RF signal, the second RF signal comprising an instruction for the wheel assembly;
    a second elongate antenna unit that is buried under the parking lot surface and adjacent to the entrance to the enclosed area, the second elongate antenna unit configured to transmit a very low frequency signal; and
    a controller in communication with the first elongate antenna unit;
    wherein, the wheel transceiver and at least one of the plurality of transceivers are configured to exchange the first and second RF signals, via the first elongate antenna unit, when the wheel travels over the first elongate antenna unit, and
    wherein the system is configured to determine a direction of travel of the wheel assembly relative to the entrance to the enclosed area based on the order that the wheel assembly receives the second RF signal from the first elongate antenna unit and the very low frequency signal from the second elongate antenna unit.

2. The system of claim 1, wherein the system is configured to determine the number and identity of the carts that are in the enclosed area.

3. The system of claim 1, wherein the first elongate antenna unit is not a looped antenna.

4. The system of claim 1, wherein the enclosed area comprises a cart corral.

5. The system of claim 1, wherein the enclosed area comprises a retail store.

6. The system of claim 1, wherein the first elongate antenna unit is also adjacent to an exit of the enclosed area.

7. The system of claim 1, wherein the instruction comprises a command to transmit information related to the status of the wheel.

8. The system of claim 1, wherein the transceivers are synchronized.

9. The system of claim 1, wherein the first or the second RF signal has a frequency of at least about 2.4 GHz.

10. The system of claim 1, wherein the first or the second RF signal has a frequency between about 800 MHz and about 900 MHz.

11. The system of claim 1, wherein the system is further configured to determine a capacity of the enclosed area for additional carts, or a time or rate at which carts are added to or removed from the enclosed area.

12. The system of claim 1, wherein to determine the direction of travel, the system is configured to determine that the wheel assembly has entered the enclosed area or to determine that the wheel assembly has exited the enclosed area.

13. A system for monitoring shopping carts, the shopping carts each able to travel over and be supported by a parking lot surface, the system comprising:
  a wheel assembly comprising a wheel and being adapted to connect with the cart, the wheel being configured and to roll on the parking lot surface and comprising a wheel transceiver, the wheel transceiver configured to transmit a first radio frequency (RF) signal, the first RF signal comprising a unique identifier of the wheel assembly;
  a first elongate antenna unit that is buried under the parking lot surface and adjacent to an entrance to an enclosed area, the first elongate antenna unit comprising a radiating cable configured to receive the first RF signal from the wheel transceiver and to transmit a second RF signal, the second RF signal comprising an instruction for the wheel assembly;
  a second elongate antenna unit that is buried under the parking lot surface and adjacent to the entrance to the enclosed area, the second elongate antenna unit configured to transmit a third RF signal;
  a base transceiver in communication with the first elongate antenna; and
  a controller in communication with the base transceiver;
  wherein, the wheel transceiver and the base transceiver are configured to bi-directionally exchange the first and second RF signals via the first elongate antenna unit when the wheel travels over the first elongate antenna unit; and
  wherein the system is configured to determine a direction of travel of the wheel assembly relative to the entrance to the enclosed area based on the order that the wheel assembly receives the second RF signal from the first elongate antenna unit and the third RF signal from the second elongate antenna unit.

14. The system of claim 13, wherein the radiating cable comprises a radiating co-axial cable.

15. The system of claim 13, wherein the enclosed area comprises a cart corral.

16. The system of claim 13, wherein the enclosed area comprises a retail store.

17. The system of claim 13, wherein the instruction comprises a command to transmit information related to the status of the wheel.

18. The system of claim 13, wherein the first, the second, or the third RF signal has a frequency of at least about 2.4 GHz.

19. The system of claim 13, wherein the first, the second, or the third RF signal has a frequency between about 800 MHz and about 900 MHz.

20. They system of claim 13, wherein the third RF signal comprises a very low frequency signal.

21. They system of claim 13, wherein the system is configured to determine one or more of: a number or identities of the carts that are in the enclosed area, a capacity of the enclosed area for additional carts, or a time or rate at which carts are added to or removed from the enclosed area.

22. The system of claim 13, wherein to determine the direction of travel, the system is configured to determine that the wheel assembly has entered the enclosed area or to determine that the wheel assembly has exited the enclosed area.

23. A fixed communication system for bi-directionally communicating with a shopping cart entering or exiting a cart corral, the shopping cart comprising a transceiver, the system comprising:
  a controller positioned on an upper portion of the cart corral;
  a first radio frequency (RF) antenna unit connected with the controller, the first RF antenna unit being buried under a surface adjacent to an entrance of the cart corral and extending across substantially all of the entrance of the cart corral;
  the first RF antenna unit being configured to wirelessly receive a first signal from the transceiver on the cart and to provide the first signal to the controller, and to transmit a third signal to the transceiver on the cart;
  the controller configured to wirelessly transmit a second signal to the transceiver on the cart via the first RF antenna unit; and
  a second RF antenna unit buried under a surface adjacent to the entrance of the cart corral, the second RF antenna unit configured to transmit a fourth signal to the transceiver on the cart;
  wherein the system is configured to determine a direction of travel of the cart relative to the entrance to the cart corral based on the order that the transceiver on the cart receives the third signal from the first RF antenna unit and the fourth signal from the second RF antenna unit,
  wherein the first signal and the second signal comprise radio frequency signals with a frequency of at least 800 MHz.

24. The system of claim 23, wherein the first signal and the second signal comprise radio frequency signals with a frequency of at least 2.4 GHz.

25. The system of claim 23, wherein the RF antenna unit comprises a radiating cable.

26. The system of claim 23, wherein the RF antenna unit comprises a plurality of transceivers.

27. The system of claim 23, wherein the first signal includes an identifier of the cart.

28. The system of claim 23, further comprising a solar panel configured to provide electrical power to the controller.

29. They system of claim 23, wherein the fourth signal comprises a very low frequency signal.

30. They system of claim 23, wherein the system is further configured to determine one or more of: a number or identities of the carts that are in the cart corral, a capacity of the cart corral for additional carts, or a time or rate at which carts are added to or removed from the cart corral.

31. The system of claim 23, wherein to determine the direction of travel, the system is configured to determine that the cart has entered the cart corral or to determine that the cart has exited the cart corral.

* * * * *

UNITED STATES PATENT AND TRADEMARK OFFICE
CERTIFICATE OF CORRECTION

PATENT NO. : 10,219,136 B2
APPLICATION NO. : 15/645822
DATED : February 26, 2019
INVENTOR(S) : Hannah et al.

Page 1 of 1

It is certified that error appears in the above-identified patent and that said Letters Patent is hereby corrected as shown below:

On the Title Page

Item (73), Line 1, under Assignee, change "inc.," to --Inc.,--.

In the Specification

In Column 5, Line 38, change "nodes" to --nodes.--.

In Column 5, Line 50, change "and or" to --and/or--.

In the Claims

In Column 13, Line 54, Claim 20, change "They" to --The--.

In Column 13, Line 56, Claim 21, change "They" to --The--.

In Column 14, Line 49 (Approx.), Claim 29, change "They" to --The--.

In Column 14, Line 51 (Approx.), Claim 30, change "They" to --The--.

Signed and Sealed this
Twenty-eighth Day of May, 2019

Andrei Iancu
*Director of the United States Patent and Trademark Office*